United States Patent
Ito

(10) Patent No.: US 7,387,247 B2
(45) Date of Patent: Jun. 17, 2008

(54) OPTICAL INFORMATION READER

(75) Inventor: Makoto Ito, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 0 days.

(21) Appl. No.: 11/511,223

(22) Filed: Aug. 29, 2006

(65) Prior Publication Data
US 2007/0045422 A1   Mar. 1, 2007

(30) Foreign Application Priority Data
Aug. 31, 2005   (JP)   ............... 2005-251355

(51) Int. Cl.
*G06K 7/10* (2006.01)
*G06K 7/14* (2006.01)

(52) U.S. Cl. ............. 235/454; 235/462.42; 235/462.43

(58) Field of Classification Search ........... 235/462.42, 235/462.43, 462.45, 472.01, 454; 362/611
See application file for complete search history.

(56) References Cited

U.S. PATENT DOCUMENTS

| | | | | |
|---|---|---|---|---|
| 5,288,984 A | * | 2/1994 | Ito et al. | ................ 235/462.22 |
| 5,326,961 A | * | 7/1994 | Sibata | .................. 235/462.07 |
| 5,369,262 A | * | 11/1994 | Dvorkis et al. | ............. 345/179 |
| 5,811,778 A | * | 9/1998 | Itou et al. | .............. 235/462.01 |
| 6,060,722 A | * | 5/2000 | Havens et al. | .............. 250/566 |
| 6,415,981 B1 | * | 7/2002 | Itou | ...................... 235/472.01 |

FOREIGN PATENT DOCUMENTS

JP   H11-015910   1/1999

* cited by examiner

*Primary Examiner*—Michael G. Lee
*Assistant Examiner*—Ali Sharifzada
(74) *Attorney, Agent, or Firm*—Posz Law Group, PLC

(57) ABSTRACT

In an optical information reader, a case, and a light source is installed in the case. The light source supplies light. A lens is installed in the case and focuses the supplied light through part of the case onto optical information attached to a target. A particle blocking member is installed in the case to be arranged between the part of the case and the light source. The particle blocking member allows light reflected from the optical information to pass therethrough. The particle blocking member is integrally provided with a holder configured to support the light source. The particle blocking member blocks flow of particles into the light source side in the case.

16 Claims, 10 Drawing Sheets

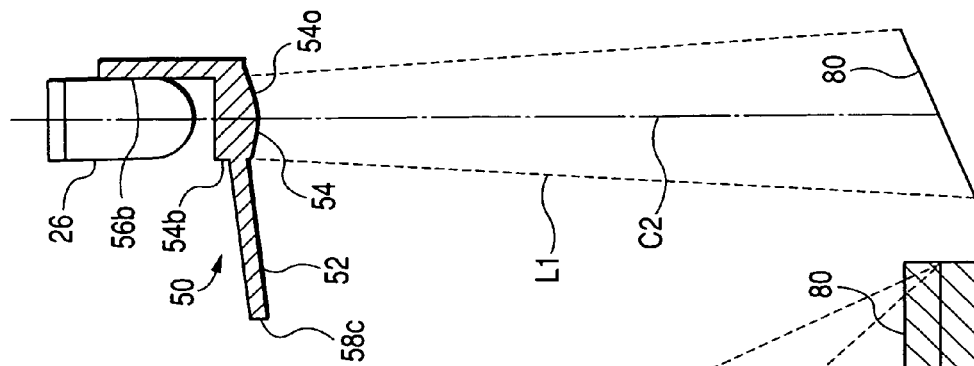
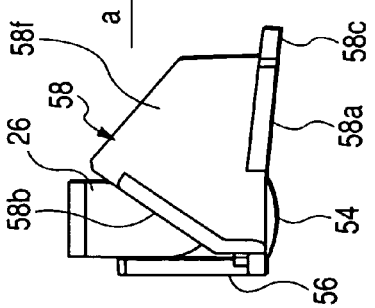
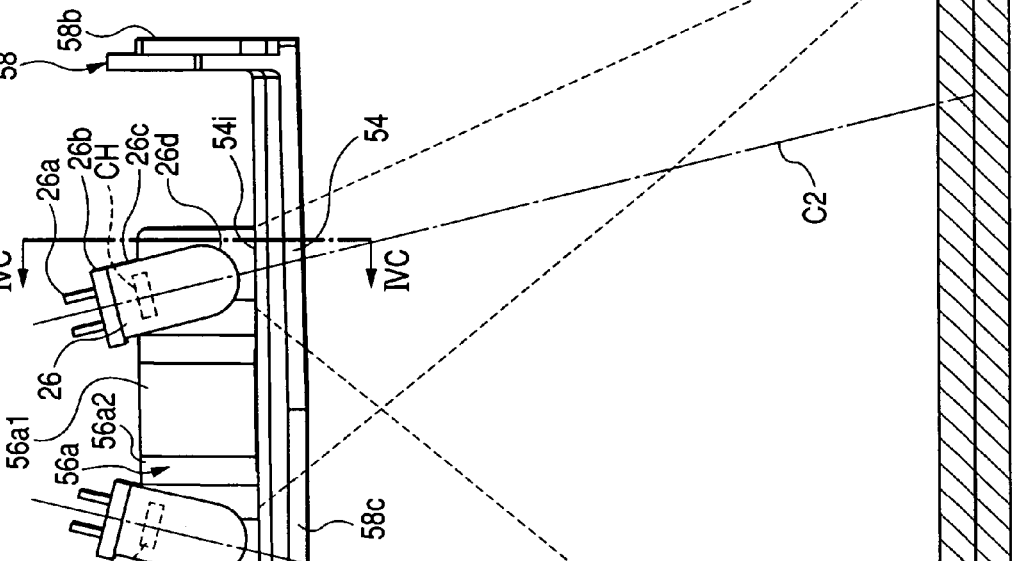

OPTICAL INFORMATION READER

CROSS REFERENCE TO RELATED APPLICATION

This application is based on Japanese Patent Application 2005-251355 filed on Aug. 31, 2005. This application aims the benefit of priority from the Japanese Patent Application, so that the descriptions of which are all incorporated herein by reference.

BACKGROUND OF THE INVENTION

1. Field of the Invention

The present invention relates to optical information scanners for optically reading information attached to a goods or the like.

2. Description of the Related Art

Handheld optical information readers, such as barcode readers, aim at scanning optically readable information, such as a barcode, a two-dimensional code, or other similar codes.

For example, barcode readers are designed to:

focus light supplied from a light source, such as a light-emitting diode, thereby irradiating the focused light onto a barcode attached to a goods as an example of a target;

detect light reflected from the barcode based on the irradiated light; and pick up an image of the barcode based on the detected light.

Specifically, barcode readers of this type normally include a handheld body case, a light source for supplying light, and an imaging optics consisting of an imaging lens and an illumination lens that focuses the irradiated light onto the whole area of a barcode.

Barcode readers also normally include a photodetector for detecting light reflected from the barcode and imaged by the imaging lens, and an electronic circuit for decoding the barcode and for communicating with external devices including a host unit, such as a register and/or a host computer. The optical or electronic components (the light source, the imaging optics, the receiving unit, and the electronic circuit) are installed in the handheld body case.

Because the handheld body case of the barcode reader has a compact size, installation of many components, such as optical or electronic components, in the case requires a great deal of time and effort. Especially, because the optical components need be disposed in the case to be optically aligned with each other precisely, it furthermore takes a lot of time and effort to install the optical components in the case.

In view of this requirement, it is desired to reduce the number of components to be installed in the barcode-reader's case as much as possible, thereby reducing time and effect required to install the components in the case.

In order to reduce the number of components to be installed in the barcode-reader's case, the applicant of this application has already proposed barcode readers designed such that the illuminating lens and the imaging lens are integrated with each other. These barcode readers are disclosed in Japanese Unexamined Patent Publication No. H11-015910.

SUMMARY OF THE INVENTION

In view of the background, an object of at least one aspect of the resent invention is to provide apparatuses for optically reading information, which are designed to allow reduction of the number of its components.

According to one aspect of the present invention, there is provided an optical information reader includes a case, a light source installed in the case and configured to supply light, and a lens installed in the case and configured to focus the supplied light through part of the case onto optical information attached to a target. The optical information reader also includes a particle blocking member installed in the case to be arranged between the part of the case and the light source. The particle blocking member allows light reflected from the optical information to pass therethrough. The particle blocking member is integrally provided with a holder configured to support the light source. The particle blocking member blocks flow of particles into the light source side in the case.

According to another aspect of the present invention, there is provided an optical information reader. The optical information reader includes a case, a light source installed in the case and configured to supply light, and a particle blocking member installed in the case to be arranged between the part of the case and the light source. The particle blocking member is integrated with a lens and a light transmissive portion. The lens is configured to focus the supplied light through part of the case onto optical information attached to a target. The light transmissive portion allows light reflected from the optical information to pass therethrough. The particle blocking member blocks flow of particles into the light source side in the case.

BRIEF DESCRIPTION OF THE DRAWINGS

Other objects and aspects of the invention will become apparent from the following description of embodiments with reference to the accompanying drawings in which:

FIG. 4A is a schematic enlarged side elevational view of a dustproof member illustrated in FIG. 1;

FIG. 4B is a schematic plan view of the dustproof member as viewed from the upper case part side;

FIG. 4C is a schematic cross sectional view taken on line IVC-IVC in FIG. 4B;

DETAILED DESCRIPTION OF EMBODIMENTS OF THE INVENTION

Embodiments of the present invention will be described hereinafter with reference to the accompanying drawings.

First Embodiment

Figure 1:
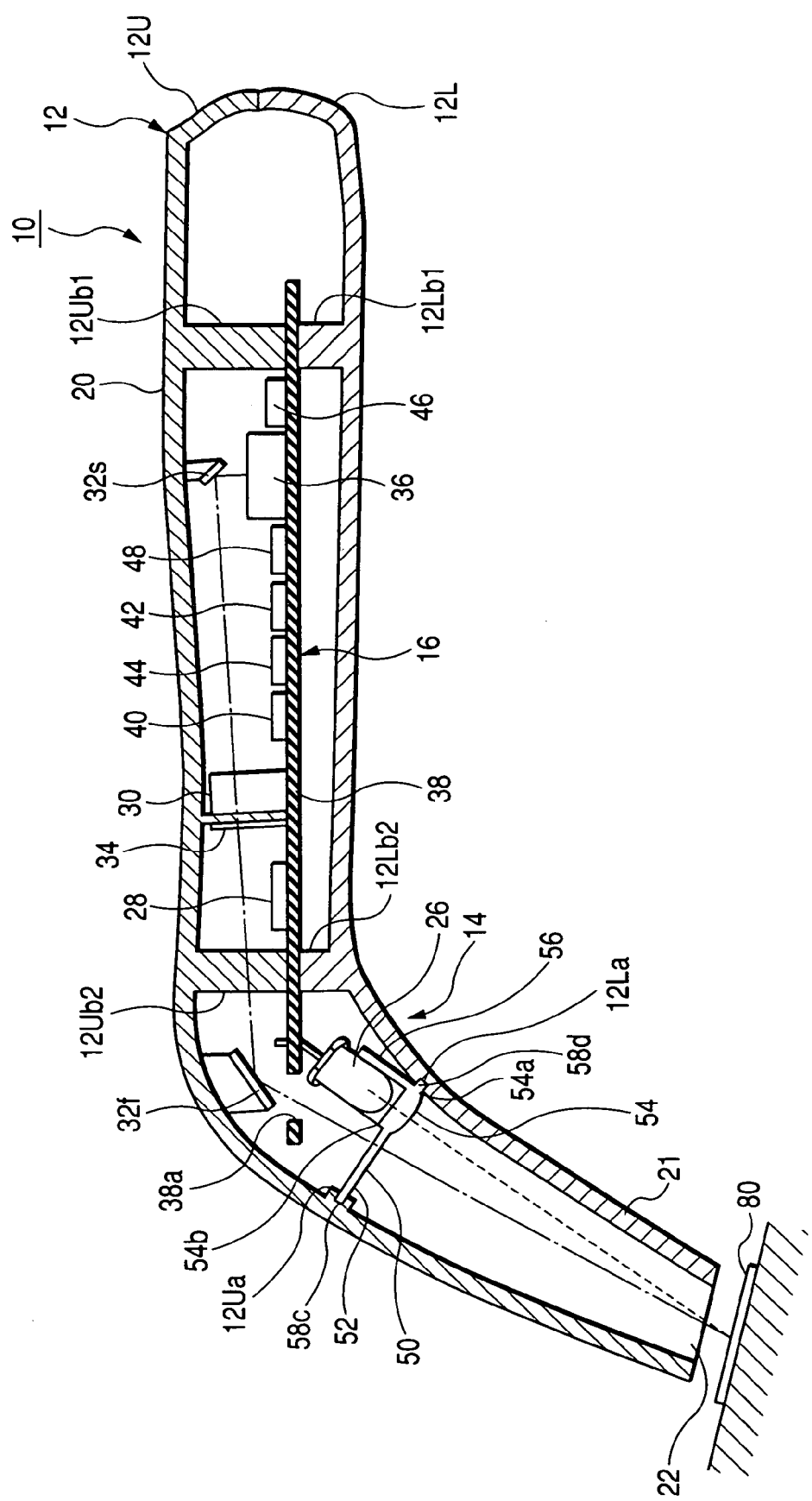
FIG. 1 is a partly cross sectional view of a barcode reader as an example of optical information readers according to a first embodiment of the present invention.
Figure 2:
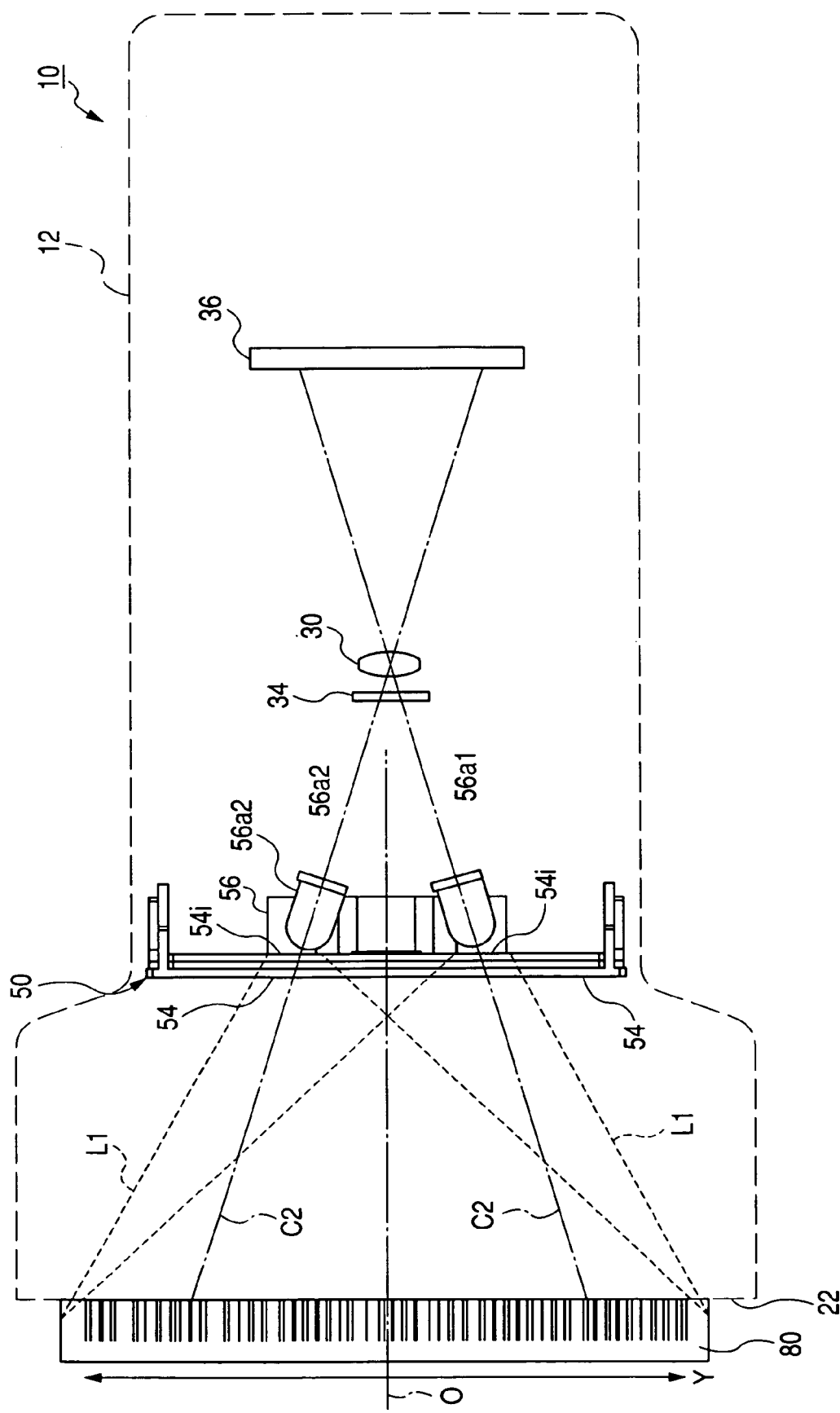
FIG. 2 is a view schematically illustrating an example of the arrangement of main components of the barcode reader for optically reading a barcode, as viewed from the back side thereof.
Figure 3:
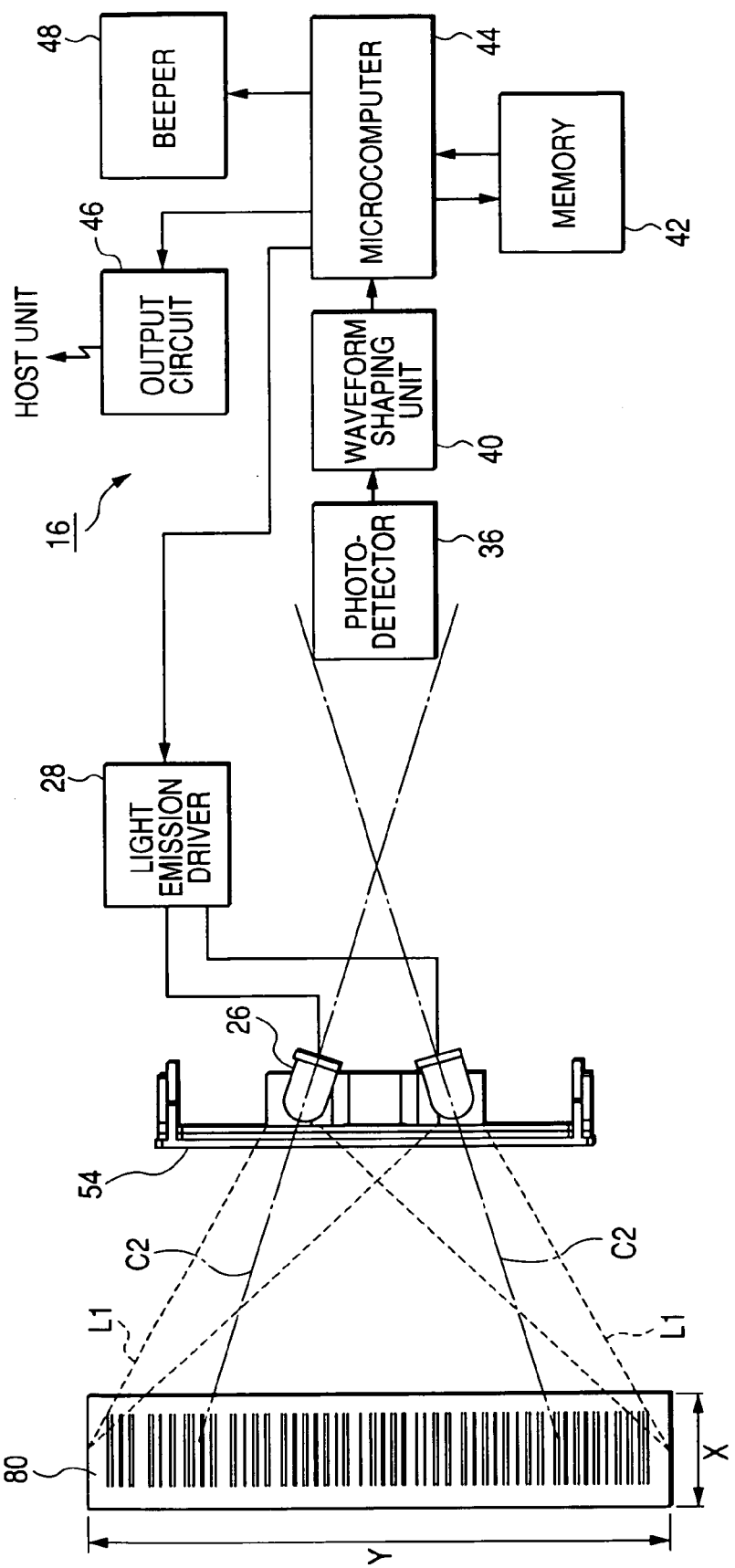
FIG. 3 is a block diagram schematically illustrating an example of the system configuration of the barcode reader.

Referring to FIGS. 1 to 3, a barcode reader 10 according to a first embodiment of the present invention is provided with a substantially gun-shaped housing (case) 12, a reading unit 14, and a data processing unit 16.

The case 12 consists of an upper case part 12U and a lower case part 12L. The upper case part 12U has an elongated hollow box structure with one opening surface, and the lower case part 12L has the symmetrical structure as the upper case part 12U. The case 12 is assembled such that the upper case part 12U is mounted at its opening-surface side edge on the opening-surface side edge of the lower case part 12L.

One end portion 21 of the case 12 in its longitudinal direction is bent to be directed diagonally to the longitudinal direction. The bent portion 21 of the case 12 will be referred to as "head portion 21" hereinafter. The remaining portion of the case 12 server as a grip portion 20 that allows a user to easily grip the barcode reader 10 in one hand and handle it.

The rectangular-shaped tip end of the head portion 21 is wholly formed with a substantially rectangular-shaped reading window 22 communicated with the inner hollow space of the head portion 21, the inner hollow space of the head portion 21 is also communicated with the inner hollow space of the grip portion 20. The inner hollow spaces of the head portion 21 and the grip portion 20 provide a light channel.

The size of the reading window 22 is designed to allow the barcode reader 10 to read various types of barcodes as targets of the barcode reader 10.

The upper case part 12U is provided with first and second mounting bosses 12Ub1 and 12Ub2, and similarly the lower case part 12L is provided with first and second mounting bosses 12Lb1 and 12Lb2.

The first mounting boss 12Ub1 is located on the inner surface wall of the upper case part 12U at a predetermined position close to the rear end of the case 12. The first mounting boss 12Lb1 is located on the inner surface wall surface of the lower case part 12L at a predetermined position opposite to the predetermined position of the first mounting boss 12Ub1.

The second mounting boss 12Ub2 is located on the inner surface wall of the upper case part 12U at a predetermined position. The second mounting boss 12Lb2 is located on the inner surface wall of the lower case part 12L at a predetermined position opposite to the second mounting boss 12Ub2. These predetermined positions of the second mounting bosses 12Ub2 and 12Lb2 allow the bosses 12Ub2 and 12Lb2 to serve as the boundary between the head portion 21 and the grip portion 20.

The barcode reader 10 is provided with a circuit board 38 constituting part of the reading unit 14 and that of the data processing unit 16 and arranged in the longitudinal direction of the grip portion 20.

The circuit board 38 is supported from both sides by the pair of first and second mounting bosses 12Ub1 and 12Ub2 and that of the first and second mounting bosses 12Lb1 and 12Lb2 such that one end is located at the rear side of the inner hollow portion of the head portion 21 ant the other end is located at that of the grip portion 20.

Components of the reading unit 14 are mainly disposed in the rear side of the inner hollow space of the head portion 21 and in the inner hollow space of the grip portion 20. Similarly, components of the data processing unit 16 are mainly disposed in the inner hollow space of the grip portion 20.

The barcode reader 10 is provided with a substantially plate-like dustproof member 50 located in the inner hollow space of the head portion 21 at a predetermined position allowing the components of the reading unit 14 and those of the data processing unit 16 to be shielded from particles, such as dusts, entering through the reading window 22 from the outside thereof. In other words, the dustproof member 50 is configured to block flow of particles into the reading unit and data processing unit side in the case 12.

The dustproof member 50 also allows red light to be transmissive therethrough; this red light is used for reading various types of barcodes in the first embodiment.

Any type of barcodes basically consists of a graphic symbol, in block form, of alternating black bars and white spaces corresponding to digital data.

The reading unit 14 is composed of a pair of illuminating red LEDs 26 (referred to simply as LEDs), a light emission driver 28, an illumination lens 54, a first reflector 32$f$, a low-pass filter plate 34, an imaging lens 30, a second reflector 32$s$, and a photodetector 36.

In the first embodiment, the dustproof member 50 is integrally composed of the illumination lens 54, a light-transmissive plate 52 as an example of light-transmissive members, and a holder 56.

Each of the LEDs 26 serving as an illumination light source is supported by the holder 56, and is electrically connected to the emission driver 28.

The dustproof member 50 is arranged in the inner hollow portion of the head portion 21 such that:

each of the LEDs 26 supported by the holder 56 is disposed close to the surface wall of the lower case part 12L;

the optical axes c2 of the LEDs 26 supported by the holder 56 are directed to one line passing through the center of the reading window 22 along the longitudinal direction thereof;

the illumination lens 54 is coaxially disposed between the reading window 22 and each LED 26; and The peripheral portion of the dustproof member 50 is gas-tightly contacted respectively an the inner wall of the upper case part 12U and that of the lower case part 12L to block the light channel formed in the head portion 21.

The alignment of each of the LEDs 26 and the illumination lens 54 permits the lower half of the light channel formed in the head portion 21 to be allocated as an illumination light channel; this lower half is the half of the light channel on the lower case part side thereof.

In addition, note that the remaining half of the light channel formed in the head portion 21 is allocated as a reflected-light channel.

Specifically, in preparation for reading a barcode 80 attached to a goods as an example of a target, the reading window 22 of the barcode reader 10 is positioned to be opposite to (e.g. substantially in contact with) barcode 80 such that the long side direction of the window 22 is substantially parallel to the length direction (see Y direction in FIG. 2) across the bars of the barcode 80.

After the preparation, when the light emission driver 28 causes each of the LEDs 26 to emit red light (illumination light), the illumination light emitted from each of the LEDs 26 through the illumination light channel is focused by the illumination lens 54 of the dustproof member 50 to be irradiated via the reading window 22 onto the barcode 80.

Light reflected from the barcode 80 via the reading window 22 based on the illumination light is transferred through the reflected-light channel in the head portion 21, and passes through the light-transmissive plate 52 of the dustproof member 50; this reflected light from the barcode 80 has an intensity pattern corresponding to the bar and space pattern (black and white pattern) of the barcode 80.

For example, based on the angle formed by the reading window 22 and the optical axis of each of the LEDs 26, the range of the direction of the reflected light from the barcode 80 with which the reading window 22 of the barcode reader 10 is located to be substantially in contact can be estimated.

In the first embodiment, the one end of the circuit board 38 is configured to extend such that it is located within the estimated range of the direction of the reflected light. For this reason, in the first embodiment, the one end of the circuit board 38 is formed with a slit 38$a$ allowing a reflected light from the barcode 80 located within the estimated range to pass therethrough.

In addition, the first reflector 32$f$ is configured and located in the inner hollow space (the reflected light channel) of the head portion 21 such that it allows reflection of the reflected light, which passes through the slit 38$a$ of the circuit board 38 in any direction, toward the inner wall surface side of the upper case part 12U in opposite to the other end portion of the circuit board 38.

The low pass filter 34 is configured and located in the inner hollow space (the reflected light channel) of the grip portion 20 such that it can receive the light reflected by the first reflector 32$f$ and block high-frequency components (noise components) contained in the reflected light.

The imaging lens 30 is configured and located in the inner hollow space (the reflected light channel) of the grip portion 20 such that it can focus the light passing through the low pass filter 34.

The second reflector 32$s$ is configured and located in the inner hollow space of the grip portion 20 above a predetermined position of the other end portion of the circuit board 38 such that it permits reflection of the focused light by the imaging lens 30 toward the predetermined position.

The photodetector 36 is composed of, for example, a line sensor consisting of a linearly array of light-sensitive elements (pixels). The photodetector 36 is disposed at the predetermined position of the other end portion circuit board 38 such that:

the liner-array direction of the photodetector 36 can be parallel to the long side direction of the reading window 22 corresponding to the length direction (Y direction) of the barcode 80; and it can receive the light reflected by the second reflector 32$s$.

Specifically, the reflected light from the barcode 80 with an intensity pattern corresponding to the bar and space pattern of the barcode 80 passes through the light-transmissive plate 52 and the slit 38$a$, and thereafter, is reflected by the first reflector 32$f$. The light reflected by the first reflector 32$f$ is focused on the photodetector 36 through the low pass filter 34 and the second reflector 32$s$ so that the light-sensitive elements of the photodetector 36 allow detection of the intensity pattern (bar and space pattern) of the barcode 80 as pixel signals.

Moreover, the data processing unit 16 is composed of a waveform shaping unit 40, a memory unit 42, a microcomputer 44, and an output circuit 46, each of which is mounted on the circuit board 38 to be arranged in accordance with a predetermined circuit design.

The waveform shaping unit 40 is electrically connected to the photodetector 36 and to the microcomputer 44. The pixel signals detected by the light-sensitive elements of the photodetector 36 are sent to the waveform shaping unit 40.

The waveform shaping unit 40 is operative to amplify the sent pixel signals at a predetermined gain, and to supply, to the microcomputer 44, the amplified pixel signals each with an intensity level depending on intensity of the illuminating light of a corresponding pixel (light-sensitive element).

Specifically, the intensity level of each of the pixel signals represents the bar and space pattern (symbology) of the barcode 80. The gain of the waveform shaping unit 40 can be set by the microcomputer 44.

The microcomputer 44 is operative to digitize the pixel signals based on their intensity levels, thereby decoding the barcode 80. The microcomputer 44 is operative to store, in the memory unit 42, the decoded data (information) to be recorded on the barcode 80. The microcomputer 44 is operative to send information stored in the memory unit 42 via the output circuit 46 to the host unit at given timing by cable, radio waves or light waves.

In addition, the beeper 48 is electrically connected to the microcomputer 44. Upon success of decoding the barcode 80, the microcomputer 44 causes the beeper 48 to beep.

The microcomputer 44 normally includes a CPU, a ROM (Read Only Memory, such as an EEPROM, flash ROM, or the like), a RAM (Random Access Memory), and an input/output interface (I/O). The CPU of the microcomputer 44 mainly operates, in accordance with programs loaded to the RAM from the ROM, to perform various tasks required to read information stored in the barcode 80 and to send the readout information to the host unit.

In the first embodiment, as set forth above, the dustproof member 50 integrally consists of the illumination lens 54, the light-transmissive plate 52, and the holder 56.

The configuration of the dustproof member 50 will be described in detail in accordance with FIGS. 4 to 8.

Referring to FIG. 1 and FIGS. 4 to 8, the dustproof member 50 is arranged in the inner hollow portion (light channel) of the head portion 21 such that:

each of the LEDs 26 supported by the holder 56 is disposed close to the inner wall surface of the lower case part 12L;

the optical axes $c2$ of the LEDs 26 supported by the holder 56 are directed to the one line passing through the center of the reading window 22 substantially in parallel to the longitudinal direction thereof;

the illumination lens 54 is coaxially disposed between the reading window 22 and each LED 26; and the illumination lens 54 and the light-transmissive plate 52 are gas-tightly contacted respectively on the inner wall of the upper case part 12U and that of the lower case part 12L to block the light channel formed in the head portion 21.

The illuminating lens 54, the light-transmissive plate 52, and the holder 56 are formed in one piece of a red-light transmissive resin(s), such as a transparent resin(s).

As mainly illustrated in FIGS. 1, 2, 4B, 6A, and 8A, the paired LEDs 26 are supported by the holder 56 and the one end of the circuit board 38 such that:

they are symmetrical with each other with respect to a reference line O passing through the center of the reading window 22 and orthogonal to the long side direction thereof; and the optical axes c2 of the LEDs 26 are inclined with respect to the reference line O with the interval therebetween being broaden toward the reading window 22.

As mainly illustrated in FIGS. 2 to 3, 4B, and 5B, the illumination lens 54 has a substantially plate-like shape. The illumination lens 54 is disposed in the head portion 21 such that its one long sidewall 54a is close to the inner wall surface of the lower case part 12L, its inner surface faces the LEDs 26, and its outer surface faces the reading window 22.

Specifically, the illumination lens 54 is formed at its inner surface with a pair of lenticular lens portions 54i disposed closely in front of the LEDs 26, respectively, such that the illumination light beams (see L1 in the figures) emitted from the LEDs 26 are entered into the paired lenticular lens portions 54i.

Each of the lenticular lens portions 54i consists of an array of very narrow cylindrical lenslets adjacently arranged to each other in a direction (array direction) parallel to the long side direction of the reading window 22 corresponding to the length direction Y of the barcode 80.

The arrangement of each LED 26 and the configuration of the corresponding lenticular lens portion 54i allow the irradiation field of the illumination light L1 to widen along the array direction of the lens portion 54i toward the reading window 22, thereby sending out the illumination light L1 with its irradiation field spreading across the reading window 22 in its long side direction corresponding to the Y direction of the barcode 80 (see FIGS. 2 and 4B).

As mainly illustrated in FIG. 4C, the illumination lens 54 is also formed at its outer surface with a convex lens portion 54o arranged in opposite to the inner surface thereof. The convex lens portion 54o allows the illumination light beams L1 passing therethrough to be focused in the narrow side direction of the reading window 22 corresponding to the height direction (see X direction in FIG. 3) of the barcode 80.

Specifically, the illumination lens 54 permits the illumination light L1 emitted from the LEDs 26 to be:

spread across the reading window 22 in its long side direction corresponding to the Y direction of the barcode 80; and focused in the narrow side direction of the reading window 22 corresponding to the height direction (see X direction in FIG. 3) of the barcode 80.

The light-transmissive plate 52 is joined at its one long sidewall with the other lone sidewall 54b of the illumination lens 54, and the other long sidewall of the light-transmissive plate 52 is close to the inner wall surface of the upper case part 12U (see FIGS. 1 and 4C).

As mainly illustrated in FIG. 4A, the dustproof member 50 is also integrally composed of a flange 58 extending from its peripheral portion.

The flange 58 consists of a pair of flange walls 58f extending from both lateral-side portions of the illumination lens 54 and from both lateral-side portions of the light-transmissive plate 52.

On the other hand, mounting flanges 60 are attached to both sides of a predetermined portion of the inner surface wall of the upper case part 12U; this predetermined portion is determined to allow the dustproof member 50 to be mounted on the inner wall of the upper case part 12U by the mounting flanges 60.

Specifically, each of the mounting flanges 60 has a substantially trapezoidal plate-like shape with a pair of parallel base sides, one of which is mounted on each side of the predetermined portion of the inner surface wall, the other of which, referred to as a top side 60c, is smaller in length than the one of the base sides. Each of the mounting flanges 60 also has a pair of inclined surfaces 60a and 60b connecting between the one and the other base sides. The top side 60c and the paired inclined surfaces 60a and 60b of each mounting flange 60 provide a substantially V-shaped configuration.

Figure 6A:
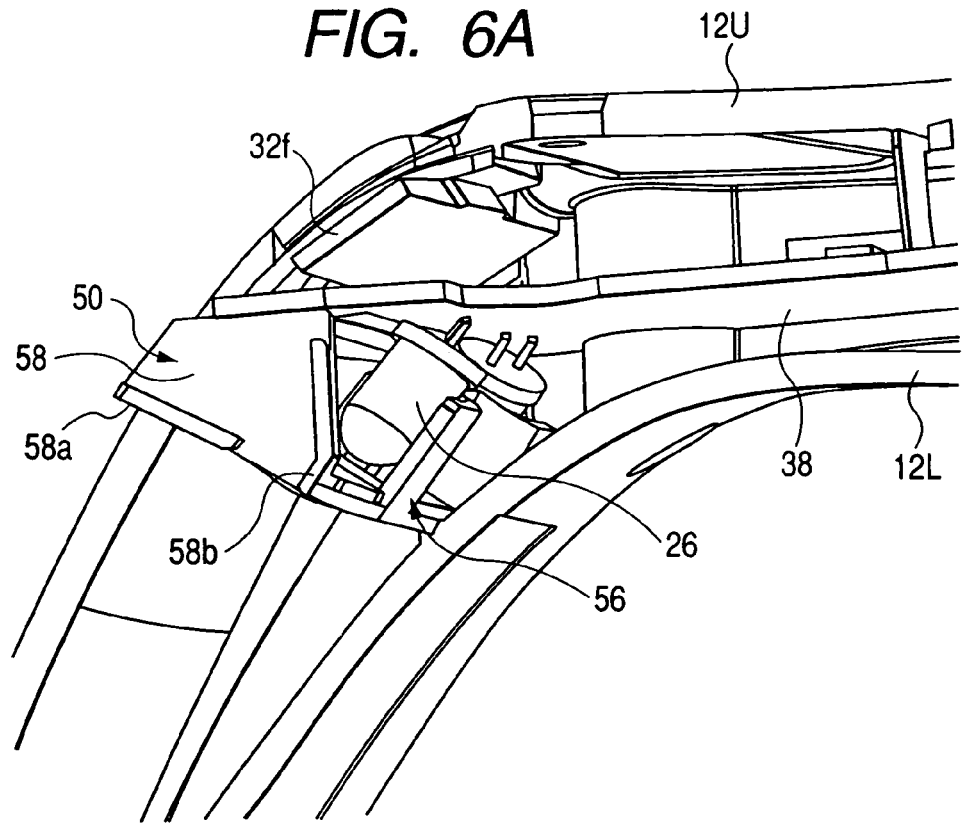
FIG. 6A is a schematic perspective view of a red light LED being supported by a holder of the dustproof member.
Figure 6B:
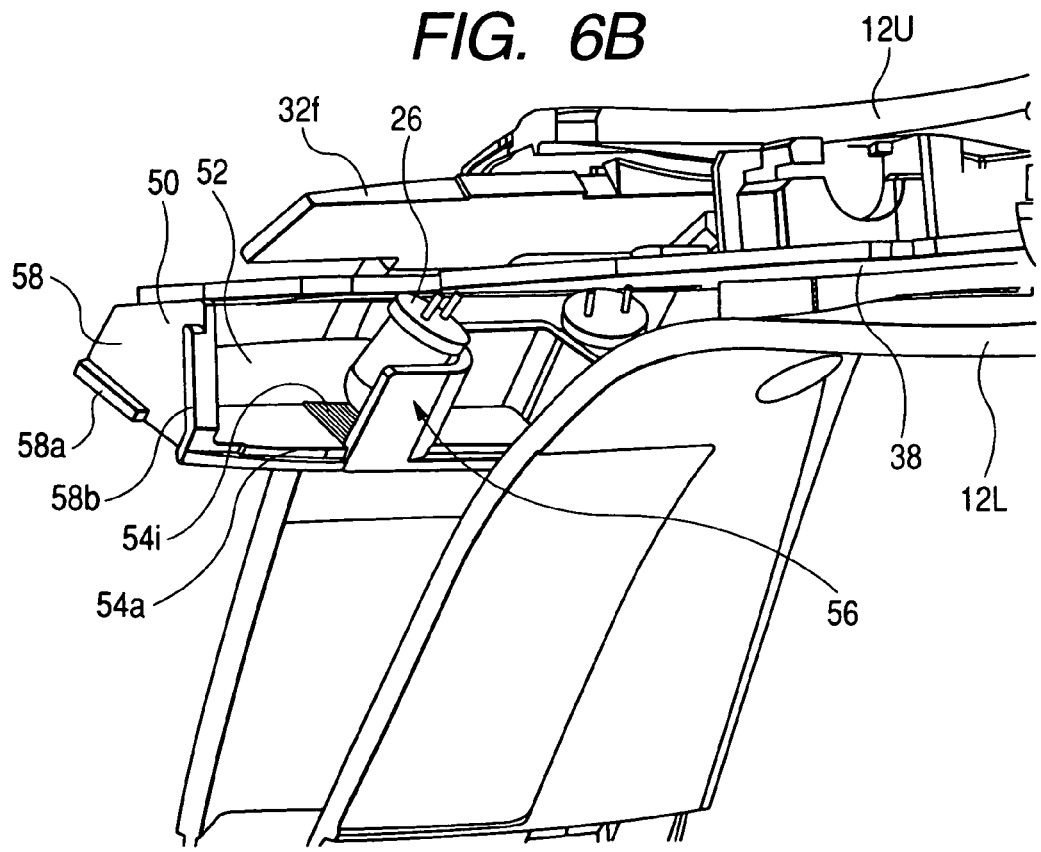
FIG. 6B is another schematic perspective view of the red light LED illustrated in FIG. 6A and being supported by the holder of the dustproof member.

As mainly illustrated in FIGS. 4A and 6A, each of the flange walls 58f has a substantially straight bar-like first guide and positioning piece 58a, referred to simply as first positioning piece, disposed along one narrow sidewall of the light-transmissive plate 52.

Each of the flange walls 58f also has a substantially straight bar-like second guide and positioning piece 58b, referred to as second positioning piece, with a slightly curved end. The second positioning piece 58b is disposed at the tip of its slightly curved end to be closely to one end of the one long sidewall 54a of the illumination lens 54 at an interval with respect to the first positioning piece 58a. The space having the interval and formed between the first and second positioning pieces 58a and 58b provide a substantially V-shaped configuration with which the V-shaped mounting flange 60 is engageable.

Figure 5A:
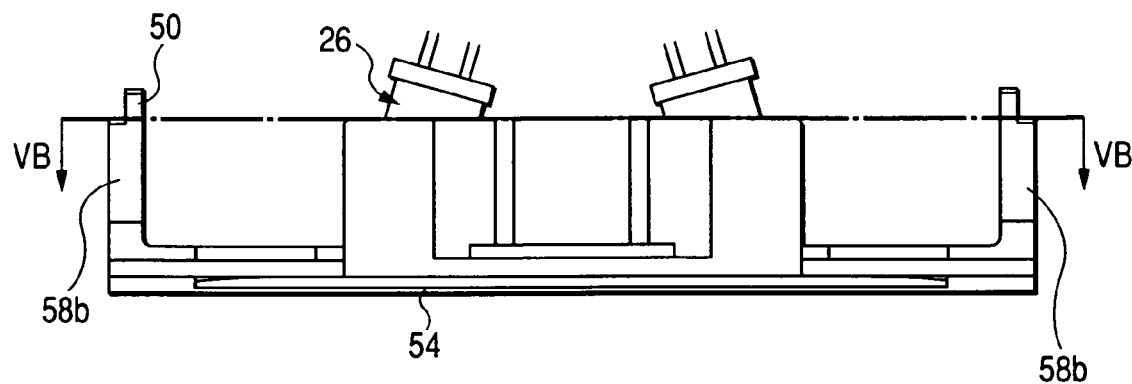
FIG. 5A is schematic plan view of the dustproof member as viewed from the lower case part side according to the first embodiment.
Figure 5B:
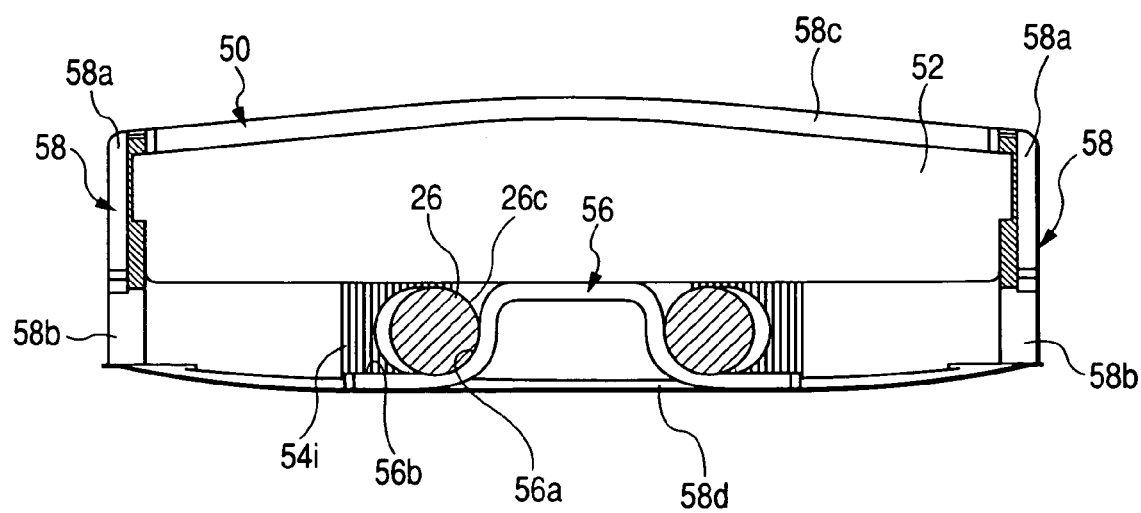
FIG. 5B is a schematic cross sectional view taken on line VB-VB in FIG. 5A according to the first embodiment.

In addition, as mainly illustrated in FIGS. 1, 4A, and 5B, the flange 58 has a first engaging piece 58c extending from the other long sidewall side of the light-transmissive plate 52. On the other hand, a first engaging slit 12Ua is formed in a predetermined portion of the inner surface wall of the upper case part 12U. The predetermined portion is determined to allow the first engaging piece 58c to be engaged with the first engaging slit 12Ua when the dustproof member 50 is displaced in a mount direction to be mounted on the inner wall of the upper case part 12U by the mounting flanges 60. The mount direction is along the surface of each flange wall 58f.

Moreover, as mainly illustrated in FIGS. 1 and 5B, the flange 58 has a second engaging piece 58d extending from the one long sidewall side of the illumination lens 54. On the other hand, a second engaging slit 12La is formed in a predetermined portion of the inner surface wall of the lower case part 12L; this predetermined portion is determined to allow the second engaging piece 58d to be engaged with the second engaging slit 12La when the dustproof member 50 is displaced in the mount direction to be mounted on the inner wall of the upper case part 12U by the mounting flanges 60.

Figure 7A:
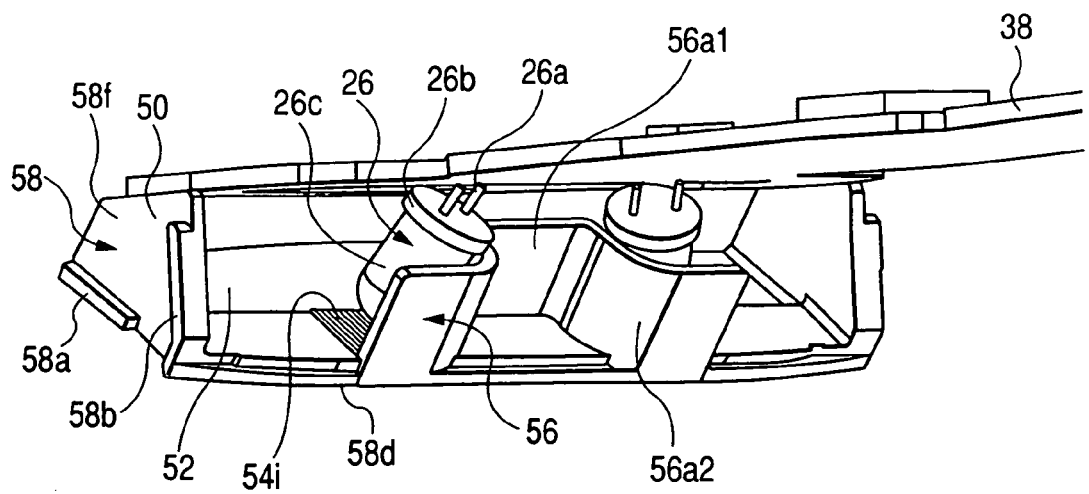
FIG. 7A is a further schematic perspective view of a red light LED being supported by a holder of the dustproof member.

As mainly illustrated in FIGS. 4B, 5B, and 7A, each of the LEDs 26 has, for example, a lead-type structure. Specifically, each of the LEDs 26 is composed of an LED chip CH, a resin mold portion encapsulating it, and leads 26a electrically connected to the LED chip CH and drawn out therefrom through the resin mold portion. The resin mold portion consists of a substantially disc-like base 26b made of transparent resin, a substantially cylindrical portion 26c made of, for example, transparent resin and coaxially extending from the base 26b, and a diverging lens 26d coaxially mounted on the cylindrical portion 26c. The base 26b, cylindrical portion 26c, and the diverging lens 26d are integrally manufactured with the use of mold resin casting.

In addition, as mainly illustrated in FIGS. 2, 4B, 5B, and 7A, the holder 56 is composed of a first supporting wall 56a with a substantially inverted U-shape. Specifically, the first supporting wall 56a consists of a base 56a1 and a pair of leg portions 56a2 extending from the base 56a1. The first supporting wall 56a is arranged vertically on the inner surface of the illumination lens 54 substantially in parallel to the surfaces of the flange walls 58f of the flange 58 such that the base 56a1 is close to the light-transmissive plate 52 and the paired leg portions 56a2 are symmetrical with each other with respect to the reference line O. In other words, the first supporting wall 56a is arranged on the inner surface of the illumination lens 54 substantially in parallel to the mount direction of the dustproof member 50 to the upper case part 12U.

The holder 56 is also composed of a pair of second supporting walls 56b extending respectively from tips of the leg portions 56a2 of the first supporting wall 56a along the long side direction of the illumination lens 54, which is orthogonal to the surfaces of the flange walls 58f of the flange 58. In other words, the paired second supporting walls 56b extends respectively from tips of the leg portions 56a2 of the first supporting wall 56a in orthogonal to the mount direction of the dustproof member 50 to the upper case part 12U.

In the first embodiment, the connection portion between each of the leg portions 56a2 and the corresponding one of the second supporting walls 56b is rounded to allow part of the outer periphery of the cylindrical portion 26c of each of the LEDs 26 to contact to the rounded connection portion to be supported thereto.

Specifically, the LEDs 26 are supported by the holder 36 such that the cylindrical portions 26c come in contact respectively with:

the leg portions 56a2 of the first supporting wall 56a at one or more points; and the second supporting walls 56b at one or more points.

Preferably, the cylindrical portions 26c respectively abut linearly on the second supporting walls 56b, In the first embodiment, the LEDs 26 are supported by the holder 36 such that the cylindrical portions 26c come in contact respectively with the rounded connection portions of the holder 56.

Figure 5C:
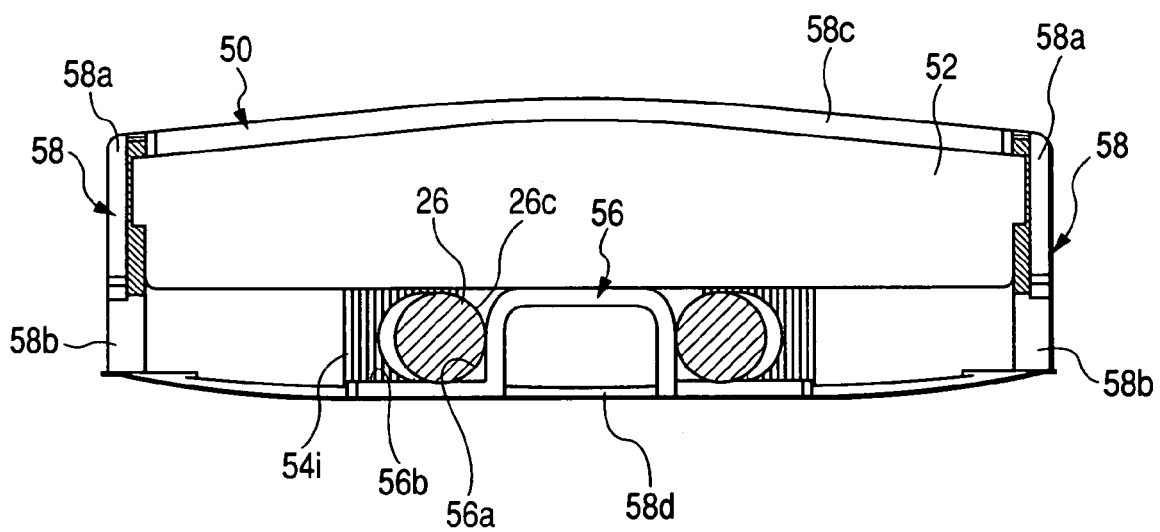
FIG. 5C is a schematic cross sectional view taken on line VB-VB in FIG. 5A according to a modification of the first embodiment.

As illustrated in FIG. 5C, each of the leg portions 56a2 and the corresponding one of the second supporting walls 56b can be connected to each other to form right angle therebetween. In this configuration, the LEDs 26 are supported by the holder 36 such that the cylindrical portions 26c come in contact respectively with:

the leg portions 56a2 of the first supporting wall 56a at one point; and linearly the second supporting walls 56b.

Figure 7B:
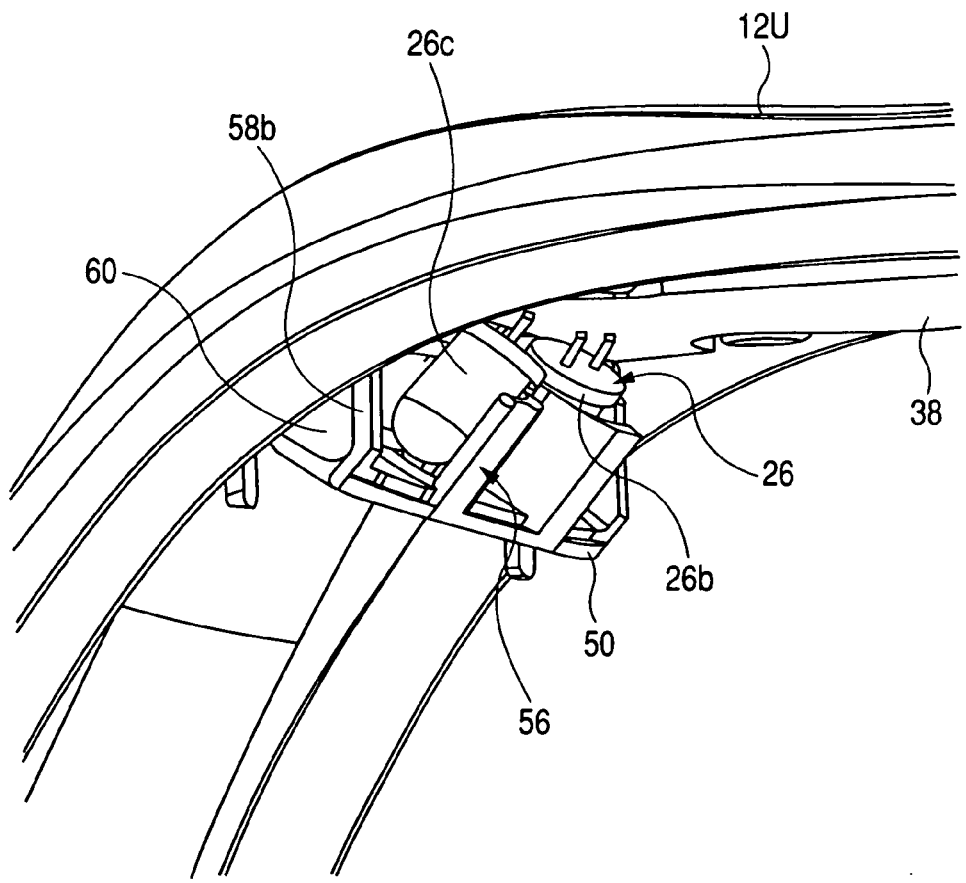
FIG. 7B is a still further schematic perspective view of the red light LED illustrated in FIG. 7A and being supported by the holder of the dustproof member.

In addition, as mainly illustrated in FIG. 7B, the LEDs 26 are mounted on the one end of the circuit board 38 with the use of a jig such that each base 26b establishes a point contact with the one end of the circuit board 38. This allows each LED 26 to be positioned at a point with respect to the circuit board 38.

Figure 8A:
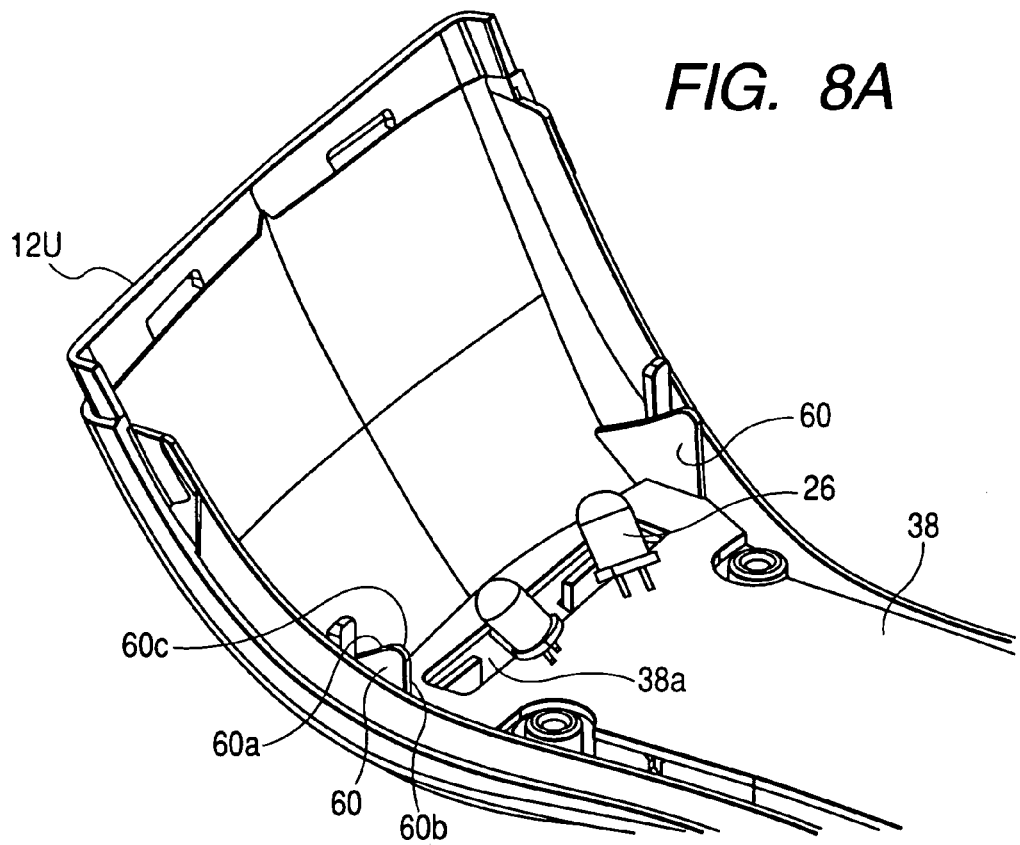
FIG. 8A is a schematic perspective view of an upper case part of a case illustrated in FIG. 1 before the dustproof member is mounted thereto.
Figure 8B:
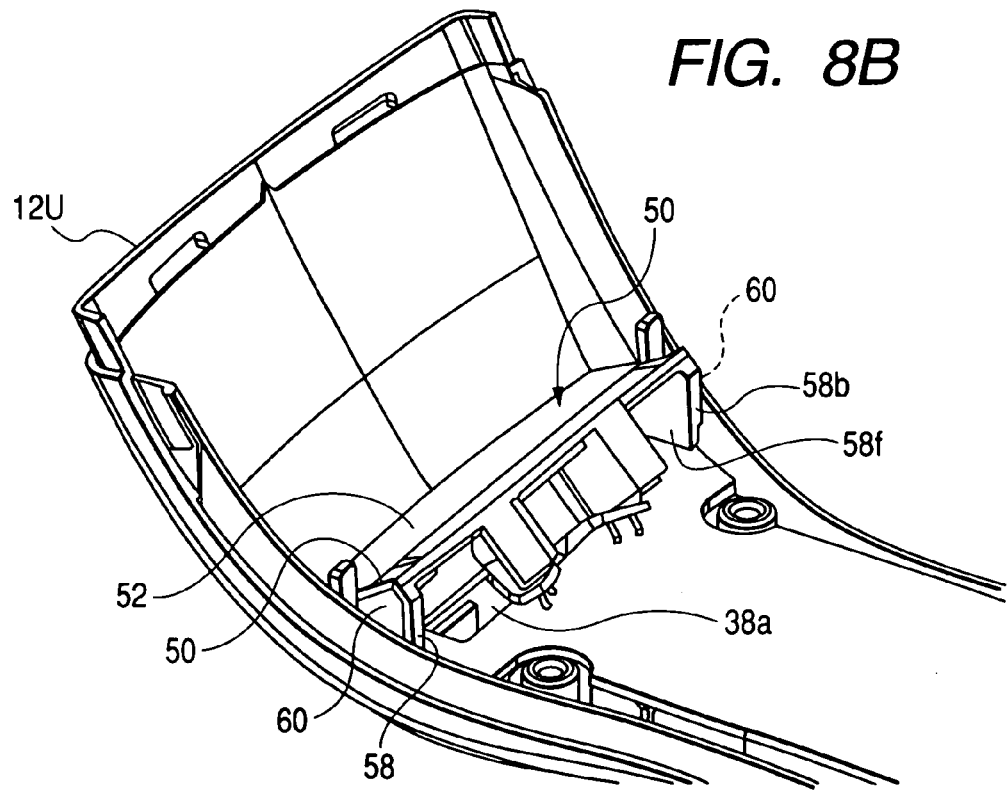
FIG. 8B is a schematic perspective view of the upper case part illustrated in FIG. 8A after the dustproof member has been mounted thereto.
Figure 9:
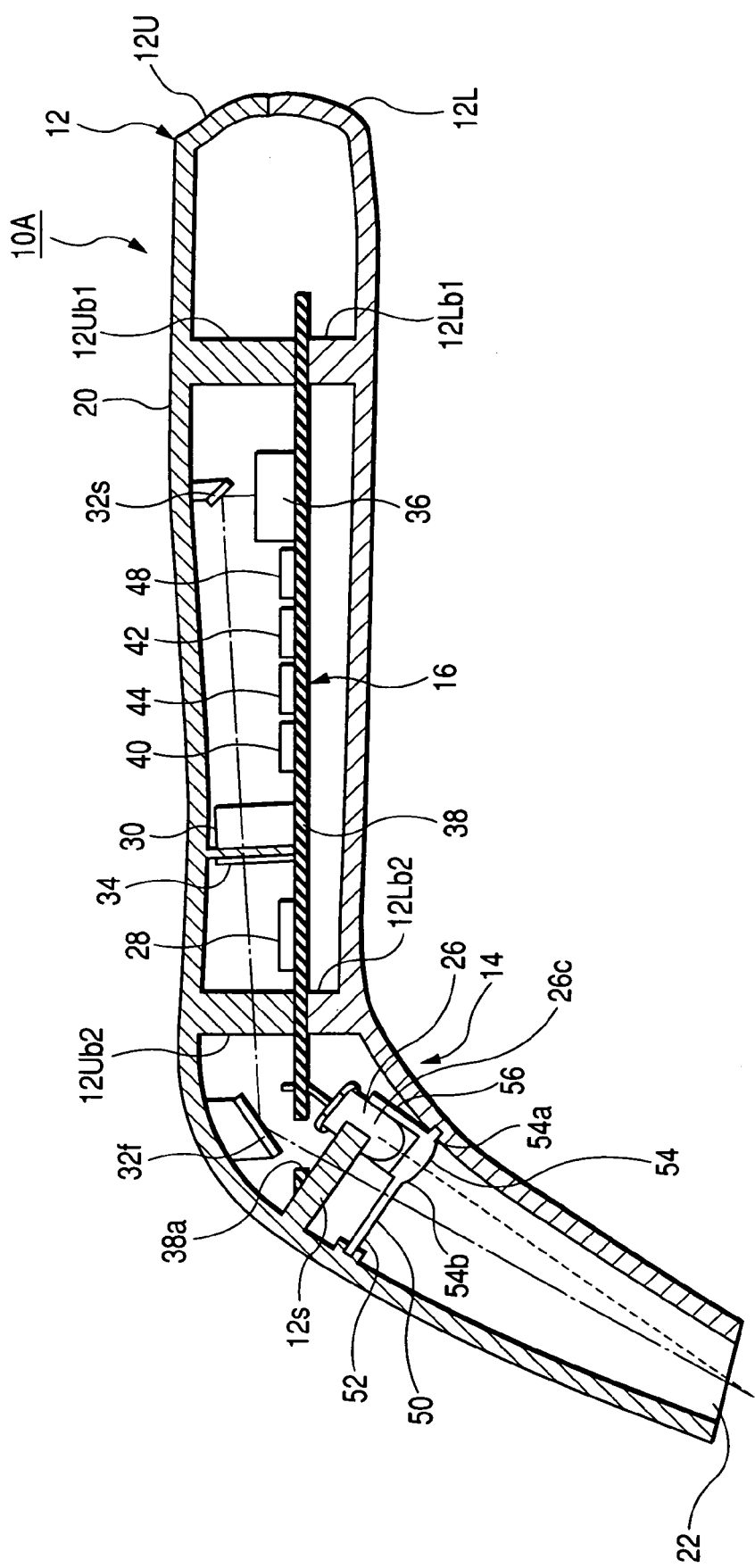
FIG. 9 is a partly cross sectional view of a barcode reader as an example of optical information readers according to a second embodiment of the present invention.

As mainly illustrated in FIGS. 7B and 8B, in mounting the dustproof member 50 onto the upper case part 12U, the dustproof member 50 is located with respect to the upper case part 12U such that each mounting flange 60 is engageably inserted into the V-shaped space formed between the first and second positioning pieces 58a and 58b of one of the flange walls 58f of the flange 58.

Thereafter, the dustproof member 50 is displaced toward the inner surface wall of the top case part 12U in the mount direction along the flange walls 58f of the flange 58 such that the first and second positioning pieces 58a and 58b of one of the flange walls 58f is slid respectively on the inclined surfaces 60a and 60b of each mounting flange 60, whereby each mounting flange 60 is closely fitted in the V-shaped space formed between the first and second positioning pieces 58a and 58b of one of the flange walls 58f.

The close fit of each mounting flange 60 of the upper case part 12U in the V-shaped space formed between the first and second positioning pieces 58a and 58b of one of the flange walls 58f of the flange 58 allows the first engaging piece 58c to be engaged in the first engaging slit 12Ua (see FIG. 1). Mounting of the dustproof member 50 onto the upper case part 12U is therefore completed.

Next, mounting of the lower case part 12L onto the upper case part 12U to assemble the case 12 permits the second engaging piece 58d to be engaged in the second engaging slit 12La (see FIG. 1). This allows the dustproof member 50 to be securely supported between the upper case part 12U and the lower case part 12L.

As set forth above, the barcode reader 10 according to the first embodiment is configured such that the dustproof member 50 serves as the holder 56 to hold and position each LED 26 in addition to a dustproof plate for shielding the components of the reading unit 14 and those of the data processing units 16 from particles. This can eliminate the need to separately provide a holder for holding each LED 26, allowing reduction of the number of components of the barcode reader 10. This makes it possible to reduce time and/or effect required to install the components in the case 12 to assemble the barcode reader 10.

Moreover, the barcode reader 10 according to the first embodiment is designed such that the holder 56 is composed of:

the first supporting wall 56a arranged on the inner surface of the illumination lens 54 substantially in parallel to the mount direction along the surface of each of the flange walls 58f of the flange 58 such that the paired leg portions 56a2 are symmetrical with each other with respect to the reference line O; and the paired second supporting walls 56b extending respectively from tips of the leg portions 56a2 of the first supporting wall 56a along the long side direction of the illumination lens 54, which is orthogonal to the mount direction along the surface of each of the flange walls 58f of the flange 58.

In mounting the dustproof member 50 onto the upper case part 12U, the configuration of the holder 56 allows:

the cylindrical portions 26c of the LEDs 26 to be slid on the legs portions 56a2 of the holder 56 while the first and second positioning pieces 58a and 58b of one of the flange walls 58f of the dustproof member 50 is slid respectively on the inclined surfaces 60a and 60b of each mounting flange 60; and the cylindrical portions 26c of the LEDs 26 to come in contact respectively with the second supporting walls 56b when each mounting flange 60 is closely fitted in the V-shaped space formed between the first and second positioning pieces 58a and 58b of one of the flange walls 58f.

This makes it possible to position each LED 26 at least two points.

As set forth above, because each LED 26 is positioned with respect to the circuit board 38 at a point (see FIG. 7B), each LED 26 is positioned in the case 12 at the three points:

the first point corresponding to a contact point of the one end of the circuit board 38 with respect to each LED 26; and the second and third points corresponding to contact points of the first and second supporting walls 56a and 56b with respect to each LED 26.

Even if the barcode reader 10 is subjected to external shock, it is possible to therefore prevent each LED 26 and the center axis C2 thereof from being misaligned, and/or cushion the external shock in order to stop each LED 26 getting damaged.

Particularly, in the first embodiment, each LED 26 is located in the case 12 such that:

the base 26b abuts on the one end of the circuit board 38 at a point;

the cylindrical portion 26c abuts on the first supporting wall 56a at a point; and the cylindrical portion 26c abuts linearly on the second supporting wall 56b.

In other words, because each LED 26 is positioned at least three points substantially symmetrically arranged with respect to the center axis C2 thereof, it is possible to securely support each LED 26 in the case 12.

Figure 5D:
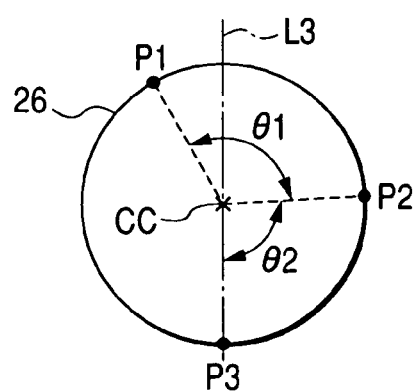
FIG. 5D is a schematic explanation view for explaining the relationship between points at which a red light LED illustrated in FIGS. 1 and 4A to 4C is supported.

FIG. 5D is a schematic explanation view for explaining the relationship between the points at which each LED 26 is supported in a case where the points are viewed on the center axis C2 thereof.

In FIG. 5D, a point P1 represents the contact point between the base 26b of each LED 26 and the one end of the circuit board 38, and a point P2 represents the contact point between the cylindrical portion 26c of each LED 26 and the first supporting wall 56a Moreover, a point P3 represents the contact point (line) between the cylindrical portion 26c of each LED 26 and the second supporting wall 56b.

In FIG. 5D, reference character L3 represents an imaginary line connecting between the point P3 and the center CC of each LED 26 along the center axis C2 thereof.

The point P2 is specially arranged at one side with respect to the imaginary line L3 (for example, at right side in FIG. 5D, and the point P1 is specially arranged at the other side with respect to the imaginary line L3 (for example, at left side in FIG. 5D.

Specifically, each LED 26 is positioned in the case 12 such that a first angle θ1 formed between a line connecting from the center CC to the point P1 and that connecting the center CC to the point P2 is equal to or greater than 90 degrees, and that a second angle θ2 formed between a line connecting from the center CC to the point P2 and that connecting the center CC to the point P3 is equal to or greater than 90 degrees.

The angle relationship among the center CC of each LED 26 and the points P1 to P3 established in the configuration of the dustproof member 50 allows the points P1 to P3 to be substantially symmetrically arranged with respect to the center CC (center axis C2). This makes it possible to prevent the center axis C2 of each LED 26 from being misaligned, and/or cushion the external shock in order to stop each LED 26 getting damaged.

More particularly, in the first embodiment, because the dustproof member 50 is integrally composed of the illumination lens 54, it is also possible to eliminate the need to separately provide a holder for holding the illumination lens 54 such that the illumination lens 54 and the LEDs 26 are aligned with each other in advance. This also permits reduction of the number of components of the barcode reader 10, and of works for alignment between each LED 26 and the illumination lens 54, making it possible to further reduce time and/or effect required to install the components in the case 12 to assemble the barcode reader 10.

Second Embodiment

A second embodiment of the present invention will be described hereinafter. An example of the configuration of a barcode reader 10A according to the second embodiment has different points from that of the barcode reader 10 according to the first embodiment.

In the first embodiment, each LED 26 is supported by the one end of the circuit board 38 such that the base 26b abuts thereon, but the second embodiment is different from the configuration.

Specifically, the barcode reader 10A according to the second embodiment includes a supporting member 12s mounted on the inner wall surface of the upper case part 12U to be disposed close to the one end of the circuit board 38. The supporting member 12s is adapted to support the cylindrical portion 26c of each LED 26 at one or more points.

Except for the supporting member 12s, the barcode reader 10A has substantially the same hardware structure as the barcode reader 10 according to the first embodiment. For this reason, descriptions of the hardware structure of the barcode reader according to the second embodiment will be omitted.

Specifically, in the second embodiment, each LED 26 is located in the case 12 such that:

the cylindrical portion 26c abuts the supporting member 12s at one or more points;

the cylindrical portion 26c abuts on the first supporting wall 56a at a point; and the cylindrical portion 26c abuts linearly on the second supporting wall 56b.

Because each LED 26 is positioned in the case 12 at three or more points, even if the barcode reader 10 is subjected to external shock, it is possible to prevent each LED 26 and the center axis C2 thereof from being misaligned, and/or cushion the external shock in order to stop each LED 26 getting damaged.

Preferably, in the second embodiment, each LED 26 can be positioned at least three points substantially symmetrically arranged with respect to the center axis C2 thereof. This makes it possible to more securely support each LED 26 in the case 12.

In each of the first and second embodiments, the present invention is applied to a gun-shaped barcode reader, but the present invention is not limited to the structure of each of the first and second embodiments.

Specifically, an optical information reader according to the present invention can have a handheld structure, and can be designed to read various types of information codes.

In addition, an optical information reader according to the present invention can be previously installed in a system such as FA (Factory Automation) system.

In each of the first and second embodiments, the reading window 22 has a substantially rectangular-shape, but can have other shapes, preferably has a symmetrical shape with respect to the center thereof.

In each of the first and second embodiments, the dustproof member 50 is integrally composed of the illumination lens 54, a light-transmissive plate (member) 52, and a holder 56, but the present invention is not limited to the structure.

Specifically, the dustproof member 50 can be integrally composed of the light transmissive member and at least one of the illumination lens 54 and the holder 56.

Moreover, in each of the first and second embodiments, the dustproof member has a substantially plate-like shape, but the present invention is not limited to the structure. Specifically, the dustproof member can have any shape allowing the components of the reading unit 14 and those of the data processing unit 16 to be shielded from particles.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An optical information reader comprising:
   a case;
   a light source installed in the case and configured to supply light;
   a lens installed in the case and configured to focus the supplied light through part of the case onto optical information attached to a target; and
   a particle blocking member installed in the case to be arranged between the part of the case and the light source, the particle blocking member allowing light reflected from the optical information to pass therethrough, the particle blocking member being integrally provided with a holder configured to support the light source, the particle blocking member blocking flow of particles into the light source side in the case, wherein the case is provided therein with a mounting member configured such that the particle blocking member is displaced in a mount direction to be mounted onto the mounting member, the holder comprises:
   a first supporting wall arranged substantially in parallel to the mount direction of the particle blocking member; and
   a second supporting wall arranged substantially orthogonal to the mount direction of the particle blocking member, and
   the light source is supported to be positioned by the first and second supporting walls such that the light source abuts on the first and second supporting walls at first and second points, respectively.

2. An optical information reader according to claim 1, further comprising a board configured to support the light source such that the light source abuts on the board at a third point, the light source being positioned by the board and the first and second circuit board at the first to third points.

3. An optical information reader according to claim 2, wherein the light source is a light emitting diode, the light emitting diode comprises a light emitting diode chip and a mold portion encapsulating the light emitting diode chip, the mold portion being composed of a base, a substantially cylindrical portion extending from the base, and a diverging lens coaxially mounted on the cylindrical portion, and wherein the cylindrical portion of the light emitting diode abuts respectively on the first and second supporting walls at the first and second points.

4. An optical information reader according to claim 2, the first to third points are substantially symmetrical with each other with respect to an optical axis of the light source.

5. An optical information reader according to claim 1, wherein the case is provided with a supporting member installed therein, the supporting member abutting on the light source to support it, the light source being positioned by the first and second supporting walls and the supporting member.

6. An optical information reader according to claim 1, wherein the part of the case is formed with a reading window, the case includes therein a light channel communicated with the reading window, the light channel allowing the supplied light and the reflected light to be traveled, and the particle blocking member is a dustproof member, the dustproof member being disposed in the light channel to gas-tightly shield the light channel.

7. An optical information reader according to claim 6, wherein the dustproof member further comprises a light-transmissive plate joined to the lens, the light-transmissive plate and the lens allowing the light channel to be gas-tightly shielded, and the dustproof member is arranged in the case such that the lens is disposed between the reading window and the light source to be coaxially aligned with the light source.

8. An optical information reader according to claim 1, wherein the mounting member has a first engaging portion with a first guide surface along the mount direction, and the particle blocking member has a second engaging portion with a second guide surface along the mount direction, and wherein the particle blocking member is displaced in the mount direction with the second guide surface being slid on the first surface to be mounted onto the mounting member.

9. An optical information reader according to claim 8, wherein the holder is arranged such that the light source abuts on the first and second supporting walls at the first and second points, respectively, when the particle blocking member is mounted onto the mounting member.

10. An optical information reader comprising:
    a case;
    a light source installed in the case and configured to supply light;
    a particle blocking member installed in the case to be arranged between the part of the case and the light source, the particle blocking member being integrated with a lens and a light transmissive portion, the lens is configured to focus the supplied light through part of the case onto optical information attached to a target, the light transmissive portion allowing light reflected from the optical information to pass therethrough, the particle blocking member blocking flow of particles into the light source side in the case; and
    a holder configured to support the light source, wherein the case is provided therein with a mounting member configured such that the particle blocking member is displaced in a mount direction to be mounted onto the mounting member, the holder comprises:
    a first supporting wall arranged substantially in parallel to the mount direction of the particle blocking member; and
    a second supporting wall arranged substantially orthogonal to the mount direction of the particle blocking member, and
    the light source is supported to be positioned by the first and second supporting walls such that the light source abuts on the first and second supporting wails at first and second points, respectively.

11. An optical information reader according to claim 10, wherein the particle blocking member is integrated with the holder.

12. An optical information reader according to claim 10, further comprising a board configured to support the light source such that the light source abuts on the board at a third point, the light source being positioned by the board and the first and second circuit board at the first to third points.

13. An optical information reader according to claim 12, wherein the light source is a light emitting diode, the light emitting diode comprises a light emitting diode chip and a mold portion encapsulating the light emitting diode chip, the mold portion being composed of a base, a substantially cylindrical portion extending from the base, and a diverging lens coaxially mounted on the cylindrical portion, and wherein the cylindrical portion of the light emitting diode abuts respectively on the first and second supporting walls at the first and second points.

14. An optical information reader according to claim 10, wherein the case is provided with a supporting member installed therein, the supporting member abutting on the light source to support it, the light source being positioned by the first and second supporting walls and the supporting member.

15. An optical information reader according to claim 10, wherein the mounting member has a first engaging portion with a first guide surface along the mount direction, and the particle blocking member has a second engaging portion with a second guide surface along the mount direction, and wherein the particle blocking member is displaced in the mount direction with the second guide surface being slid on the first surface to be mounted onto the mounting member.

16. An optical information reader according to claim 15, wherein the holder is ranged such that the light source abuts on the first and second supporting walls at the first and second points, respectively, when the particle blocking member is mounted onto the mounting member.

* * * * *